SUBSTITUTED FOR TORN COPY.
Search Room
73. MEASURING AND TESTING.
234
No Printed Specification Available
WILLSON & FOX.
Gas Meter.
No. 316. A. I. Patented Feb. 26, 1861.
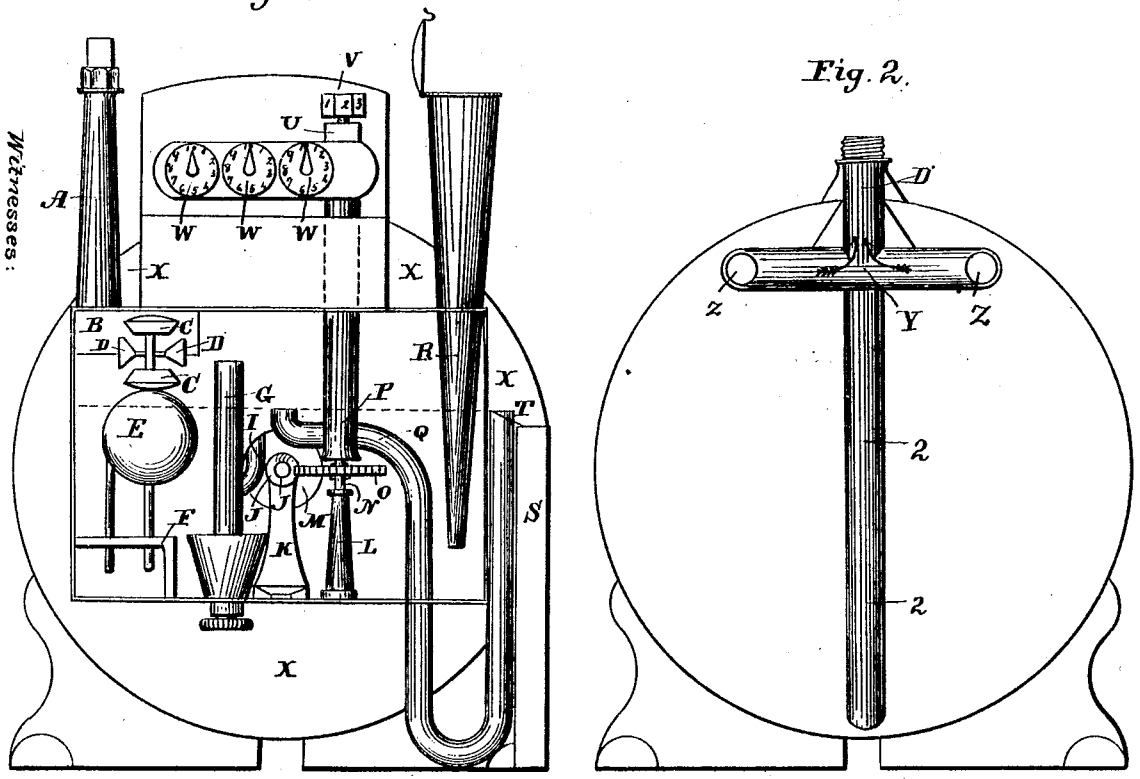
Witnesses:
J. D. Willson
E. D. Smith
Inventors:
Willson & Fox
N. PETERS, Photo-Lithographer, Washington, D. C.